United States Patent [19]

Kuhn et al.

[11] Patent Number: 4,924,524
[45] Date of Patent: May 8, 1990

[54] BEARING ASSEMBLY FOR THE WORKING SPINDLE OF A MACHINE TOOL

[75] Inventors: Siegfried Kuhn, Dürnau; Bernhard Philipp, Eislingen; Hermann Schulten, Birenbach, all of Fed. Rep. of Germany

[73] Assignee: Boehringer Werkzeugmaschinen GmbH, Bundesrepublik, Fed. Rep. of Germany

[21] Appl. No.: 336,353

[22] PCT Filed: Jul. 8, 1988

[86] PCT No.: PCT/EP88/00613
§ 371 Date: May 8, 1989
§ 102(e) Date: May 8, 1989

[87] PCT Pub. No.: WO89/00090
PCT Pub. Date: Jan. 12, 1989

[30] Foreign Application Priority Data

Jul. 8, 1987 [DE] Fed. Rep. of Germany ....... 3722572

[51] Int. Cl.$^5$ ............................................. F16C 19/08
[52] U.S. Cl. ..................................... 384/537; 384/551
[58] Field of Search .............. 384/490, 512, 551, 613, 384/537, 609

[56] References Cited

U.S. PATENT DOCUMENTS 2,012,677 8/1935 Alden .
2,626,842 1/1953 Burks ................................. 384/609

FOREIGN PATENT DOCUMENTS 490972 2/1930 Fed. Rep. of Germany .
977572 4/1967 Fed. Rep. of Germany .
2907483 8/1980 Fed. Rep. of Germany .
679737 4/1930 France .
456707 1/1975 U.S.S.R. .

OTHER PUBLICATIONS

Microtenic vol. IX, No. 4, p. 199 FF.
"Superprecision Ball Bearings . . . " (no date).
Werkstatt und Betrieb 106, No. 2, "Werkzeugmaschinenspindeln" (Feb. 1973).
Pittroff, "Gestaltungsrichlinien . . . " (1974).
"Lagerungen . . . ", Werkstatt und Betrieb 111, No. 4 (1978).

Primary Examiner—Lenard A. Footland
Attorney, Agent, or Firm—Dykema Gossett

[57] ABSTRACT

A bearing assembly for the working spindle of a machine tool such as a lathe, is disclosed consisting of angular contact ball bearings in a tandem O arrangement with an inside ball bearing, a middle ball bearing and an outside ball bearing. In order for the effective cantilever length in such bearing arrangement to be as short and well defined as possible and while also remaining approximately constant under load, the spindle has a larger diameter in the area of the outside bearing than in the area of the other bearings.

4 Claims, 1 Drawing Sheet

BEARING ASSEMBLY FOR THE WORKING SPINDLE OF A MACHINE TOOL

TECHNICAL FIELD

This invention concerns a bearing assembly of the type used in the working spindle of a machine tool.

BACKGROUND ART

It is known that the working spindle of a lathe, for example, can be mounted in the area of the hub of the spindle in roller bearings with ball-cylinder rollers, in roller bearings with tapered rollers, in friction bearings, in hydrostatic bearings or hydrodynamic bearings. Conventional angular contact ball bearings are supplied by the manufacturer with different levels of prestress. Normally bearings with a low prestress are used. In order to achieve optimum conditions with regard to the prestress required in use of double row cylinder bearings with a tapered bore, it is also known that the taper on the main spindle can be designed with a positive slope in order to impart a different prestress to the rows of cylindrical rollers. However, this requires a suitable corresponding design of the bearing bore.

The reason why certain prestress conditions are desired is the fact that the cantilever length of the spindle, i.e., the lever arm which acts on a certain bearing and is the determining factor for the bowing of the spindle, should be as short and defined as possible.

With a conventional working spindle bearing with angular contact ball bearings in tandem O arrangement, this cantilever length cannot be defined precisely in many cases because it is impossible to assure that the outer bearing has the greatest prestress and thus also the greatest rigidity. This cantilever length enters the calculation of rigidity with the third power and can extend into the middle bearing if the prestress of the individual bearings is not defined with sufficient accuracy, and this has negative effects on the efficiency and accuracy of the entire bearing assembly. This disadvantage appears especially when the workpiece to be machined is held only in a chuck without additional support.

In order to have the shortest possible cantilever length, it is already known (German Patent No. 3,233,914) that the bottom of a chuck to be mounted on the spindle flange can be integrated into this flange and thus the effective cantilever length is shortened. However, the the bearing application cannot be improved by this measure.

SUMMARY OF THE INVENTION

This invention is directed toward solving the problems of the bearing assembly of the type defined above, so the effective cantilever length is as short and well defined as possible and remains approximately constant under load In order to solve the above problems, according to the present invention, a bearing assembly is provided for the working spindle of a machine tool such as a lathe, which includes angular ball bearings in a tandem O arrangement with an inside ball bearing, a middle ball bearing and an outer ball bearing, wherein the diameter of the spindle in the area of the outer bearing is larger than that in the area of the inner and middle ball bearings. The spindle preferably has a step in the area of transition between the middle bearing and outer bearing. The section of the spindle having a larger diameter preferably extends beyond the area of the outer bearing.

A spacer is provided between the inside bearing and the middle bearing, which consists of an outside ring and an inside ring which are concentric with each other wherein the inside ring possesses a width which is smaller than that of the outside ring.

Due to the larger diameter of the working spindle in the area of the outer bearing, this bearing has a greater prestress than the other bearings. The effect of this is that the cantilever length, which is a determining factor for the rigidity of the spindle, extends only approximately to the middle of this outer bearing. By selection of appropriate dimensions, it is possible to assure that this optimum cantilever length will remain constant even under the conventional loads and thus the operating conditions can be defined precisely.

Since it is necessary with bearing applications of the type defined initially to achieve a balanced design with regard to prestress, the goal is to have the outer and inner bearings exposed to approximately the same prestress, while the middle bearing should be free of prestress. This can be achieved by using a spacer between the middle bearing and the inside bearing, where the spacer consists of an outer ring and an inner ring concentric to the former and having a width smaller than the outer ring. When using such a spacer, the low prestress, which the middle bearing has before it is installed in a machine, is compensated.

BRIEF DESCRIPTION OF THE DRAWINGS

This invention will now be explained with reference to the accompanying drawings, wherein.

DETAILED DESCRIPTION OF THE PREFERRED EMBODIMENTS

Figure 1:
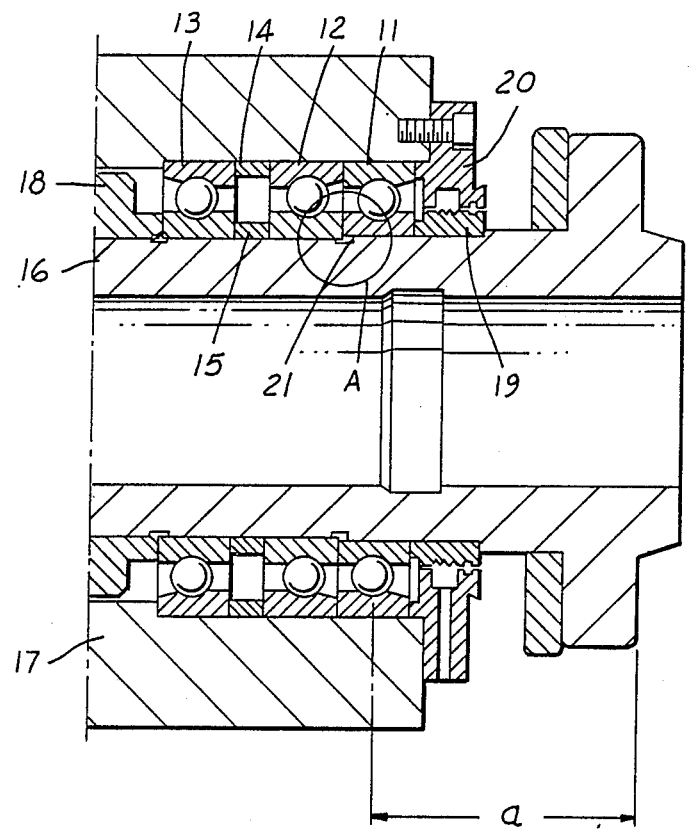
FIG. 1 shows an axial section through a working spindle of a lathe in the area of the hub of the spindle; and, FIG. 2 shows an enlarged detail taken from FIG. 1.

The bearing application according to this invention is an arrangement having angular contact ball bearings in a tandem O arrangement with an outer bearing 11 and a middle bearing 12, both of which have lines of action inclined by the same angle, and with an inner bearing 13 having a line of action inclined in the opposite direction. Bearings 11 and 13 are arranged in the bore of machine housing 17 of a lathe and sit on the working spindle 16.

Figure 2:
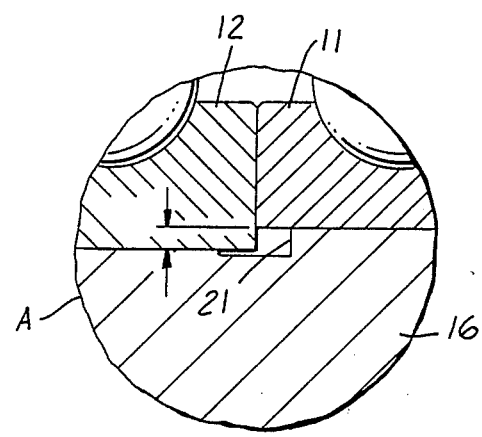

As shown in FIG. 2, spindle 16 has a step 21 in the area of outer bearing 11 and thus has a larger diameter than in the area of middle bearing 12 and inner bearing 13. Due to this larger diameter, outer bearing 11 has a greater prestress than the other bearings, so the cantilever length, which is labeled as a in FIG. 1, has a precisely defined length and extnds only approximately to the middle of this bearing, whereas if the prestress of outer bearing 11 is not large enough, i.e., if the prestress of the middle bearing 12, for example, is larger, then cantilever length a can extend as far as middle bearing 12.

The section of spindle 16, which has a larger diameter, extends beyond the range of outer bearing 11. Outside of outer bearing 11, there is a labyrinth gland 19. In addition, the bearing application is secured at the outside by a covering ring 20 which is bolted to the machine housing 17. The section of spindle 16, which has a larger diameter, is shown with a thicker line for the purpose of emphasis.

In order to achieve a balanced bearing application with regard to prestress, a spacer consisting of an outer ring 14 and an inner ring 15, which is concentric with the former but has a smaller width than the outer ring, is used between middle bearing 12 and inside bearing 13. The effect achieved by using a spacer designed in this way is that the outer bearing 11 and the inside bearing 13 have approximately the same prestress, while the middle bearing 12 is free of prestress. The bearing application is prestressed in the axial direction by a conventional two-step interference fit.

What is claimed is:

1. In combination, for use with a machine tool:
    a working spindle;
    an assembly of angular ball bearings arranged in tandem relationship on said spindle and including an inner bearing, a middle bearing and an outer bearing,
    said spindle having a section of larger diameter in the area of the outer bearing than in the area of the inner and middle bearings; and
    spacing means between said inside bearing and said middle bearing, said spacing means including an inner ring and an outer ring, said inner ring being concentric with said outer ring and having a width less than the width of said outer ring.

2. The combination of claim 1, wherein said spindle includes a step therein defining a transition between said area of said outer bearing and said area of said inner and middle bearings.

3. The combination of claim 2, wherein said section of said spindle having a larger diameter extends beyond said area of said outer bearing.

4. The combination of claim 1, wherein said section of said spindle having a larger diameter extends beyond said area of said outer bearing.

* * * * *